Feb. 9, 1926.　　　　　　　　　　　　　　　　1,572,306
F. NORTHCUTT
CHURN
Filed Nov. 13, 1924

Inventor
F. Northcutt
By Clarence A. O'Brien
Attorney

Patented Feb. 9, 1926.

1,572,306

UNITED STATES PATENT OFFICE.

FLORENCE NORTHCUTT, OF CALDWELL, KANSAS.

CHURN.

Application filed November 13, 1924. Serial No. 749,650.

*To all whom it may concern:*

Be it known that I, FLORENCE NORTHCUTT, a citizen of the United States, residing at Caldwell, in the county of Sumner and State of Kansas, have invented certain new and useful Improvements in a Churn, of which the following is a specification.

This invention relates to improvements in churns and has for its principal object to provide a simple and efficient means whereby a vertical reciprocating as well as an oscillatory movement is imparted to the dasher member for facilitating the agitation and the churning of the milk.

A further object of the invention is to provide a churn of the above mentioned character, which includes an outer and an inner receptacle, the inner receptacle being provided with openings in the upper and lower portions thereof whereby the cream is adapted to pass inwardly through the openings in the top of the inner receptacle into the outer receptacle, when the dasher is moved in one position, the cream being adapted to be drawn into the inner receptacle through the openings in the bottom thereof when the dasher moves in the opposite direction.

A further object of the invention is to provide a churn of the above mentioned character, which is simple in construction, inexpensive, strong and durable and furthermore adapted for the purposes for which it is designated.

Other objects and advantages of this invention will become apparent during the course of the following description.

Figure 1:
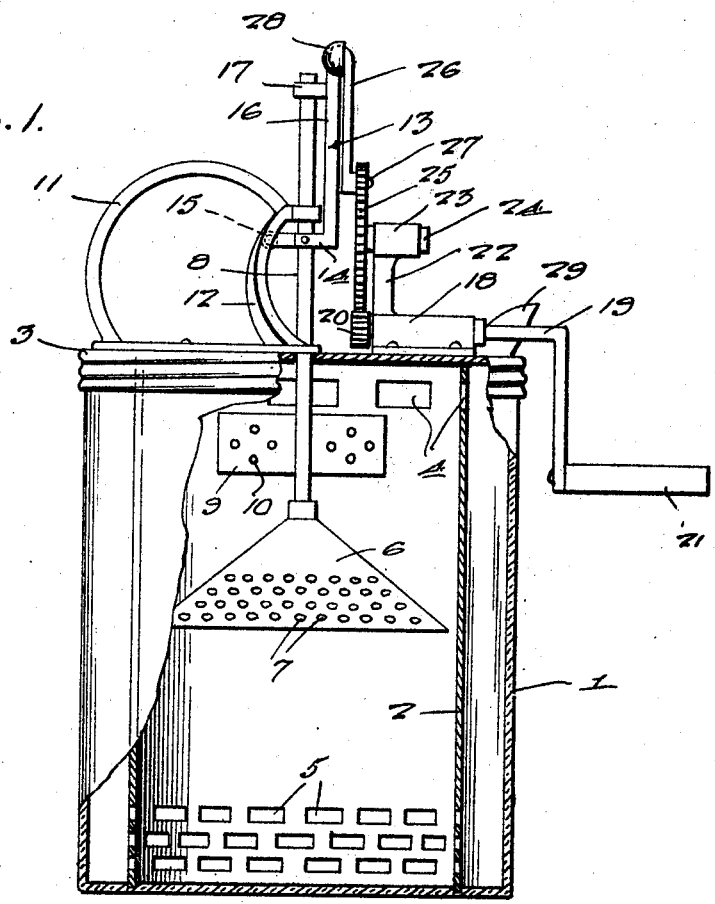
Figure 2:
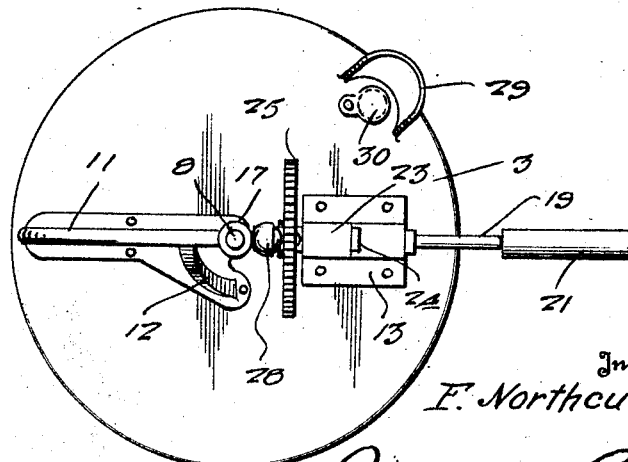

In the accompanying drawing forming a part of this specification and in which like numerals designate like parts throughout the same:

Figure 1 is a view partly in elevation and partly in section of the churn embodying my invention, and Figure 2 is a top plan view thereof.

In the drawing wherein for the purpose of illustration is shown the preferred embodiment of my invention, the numerals 1 and 2 designate a pair of concentrically arranged receptacles, the tops of which are open and as is clearly shown in Figure 1 of the drawing, the receptacle 2 is disposed within the receptacle 1. The outer receptacle 1 is preferably formed of glass while the inner receptacle may be formed of any suitable metallic material. The upper portion of the outer receptacle 1 is externally threaded for receiving the cover 3 and as also shown in Figure 1, the upper edge of the inner receptacle 2 lies substantially flush with the upper edge of the outer receptacle so that the cover 3 will extend over the upper edge of the inner receptacle.

The inner receptacle 2 is provided with an annular series of spaced openings or slots 4 adjacent the upper edge thereof while the lower portion of the inner receptacle is also provided with annular series of similar openings 5, the same being arranged in rows, the openings in the several rows being further arranged in staggered relation. The purpose of the provision of the openings in the receptacle 2 will hereinafter be more fully described.

A substantially conical shaped dasher 6 is adapted for reciprocatory movement in the inner receptacle 2 and the same is provided with a series of openings 7. The dasher 6 is secured on the lower end of a vertical rod 8 which extends centrally through the cover 3. An agitator blade 9 is also secured to the lower portion of the rod 8 above the conical shaped dasher 6 and is adapted for cooperation with the contents in the upper portion of the inner receptacle 2. The agitator blade 9 is also provided with a series of openings 10 for the purposes well known in the art.

A handle 11 is secured to the cover 3 and associated therewith is the substantially spiral track 12, the upper and lower ends of which receive the intermediate portion of the rod 8. The purpose of the track will also hereinafter be more fully described. A substantially L-shaped member 13 has the shorter arm 14 thereof secured to the intermediate portion of the rod 8 and the outer end thereof has a roller 15 carried thereby adapted for cooperation with the spiral track 12. A bearing for the upper portion of the rod 8 is carried by the upper portion of the longer arm 16 of the L-shaped member 13 and is designated by the numeral 17.

Also carried by the cover 3 directly opposite the spiral track 12 is a bracket 18 though which extends the crank lever 19, the inner end of which carries thereon a pinion 20.

A handle 21 is associated with the outer end of the crank lever 19 for facilitating the rotation thereof. The inner portion of the bracket 18 has extending upwardly therefrom the standard 22 and the upper portion will support the bearing 23 in which is journaled the shaft 24. A gear 25 is carried by the inner end of the shaft 24 and meshes with the pinion 20 so that the same will be rotated by the pinion. A link 26 is eccentrically and pivotally connected at its lower end to the gear 25 as illustrated at 27. The upper end of the link 26 is connected to the upper end of the longer arm 16 of the L-shaped member 13 by a suitable ball and socket connection 28.

When the handle 21 is rotated, rotary motion will be imparted to the shaft 24 which carries the pinion 25 and in turn, a vertical reciprocatory movement will be imparted to the rod 8 on the lower end of which is carried the dasher 6. As the dasher 6 moves downwardly in the inner receptacle 2, the roller 15 on the outer end of the shorter arm 14 of the L-shaped member 13 will travel downwardly on the spiral track 12 and simultaneously impart a slight rotary motion to the rod 8 and the agitator blade and dasher carried on the lower portion thereof. When the dasher 6 is moved downwardly, the cream in the inner receptacle is partially discharged out through the openings 5, thereby causing the cream in the outer receptacle to overflow through the openings 4 into the inner receptacle. As the dasher moves upwardly, the cream in the inner receptacle will be partially forced out through the openings 4 from the inner receptacle to the outer receptacle, and partially sucked through the openings 5, from the outer receptacle to the inner receptacle.

It will be further noted that as the dasher moves downwardly in the inner receptacle 2, the cream has a whirling motion imparted thereto because of the rotation of the dasher in one direction, and this whirling motion is also imparted to the cream being forced through the opening 5 into the outer receptacle. As the dasher moves upwardly in the inner receptacle it rotates in an opposite direction so that there is imparted to the cream a whirling motion in the same direction which whirling motion is also imparted to the cream passing through the opening 4 into the outer receptacle. Therefore, in the outer receptacle the cream in the bottom has a tendency to whirl in an opposite direction from that in the upper portion, thereby causing the additional agitation and mixing of the cream in this outer receptacle.

A discharge spout 29 is associated with the cover 3 adjacent a suitable discharge opening provided in the cover, the opening being normally closed by means of the swinging closure 30.

It will thus be seen from the foregoing description, that a churn has been provided wherein considerable time and labor will be saved in actuating the same for churning the milk and furthermore the parts are so arranged as to permit the same to be readily disassembled whenever it becomes necessary.

While I have shown the preferred embodiment of my invention, it is to be understood that various changes in the size, shape and arrangement of parts may be resorted to without departing from the spirit of the invention and the scope of the appended claim.

Having thus described my invention, what I claim is:—

A churn operating mechanism including a bracket, a spiral track mounted thereon, a rod mounted for rotary and reciprocatory motion in the bracket, an L-shaped member having the intermediate portion of the shorter arm engaged with an intermediate portion of the rod and the extremity of the shorter arm engaged with the spiral track, means for fixing the end of the longer arm of the L-shaped member adjacent an extremity of the rod, said end of the longer arm of the L-shaped member being in the form of a socket, a pitman having one end in the form of a pawl receivable in the socket, a rotatably mounted wheel, means for rotating the wheel and means for eccentrically connecting the pitman to the wheel, whereby the rotation of the wheel will cause a rotary and reciprocatory motion to be imparted to the rod through the intermediacy of the L-shaped member and its engagement with the spiral track.

In testimony whereof I affix my signature.

FLORENCE NORTHCUTT.